Figure 1:
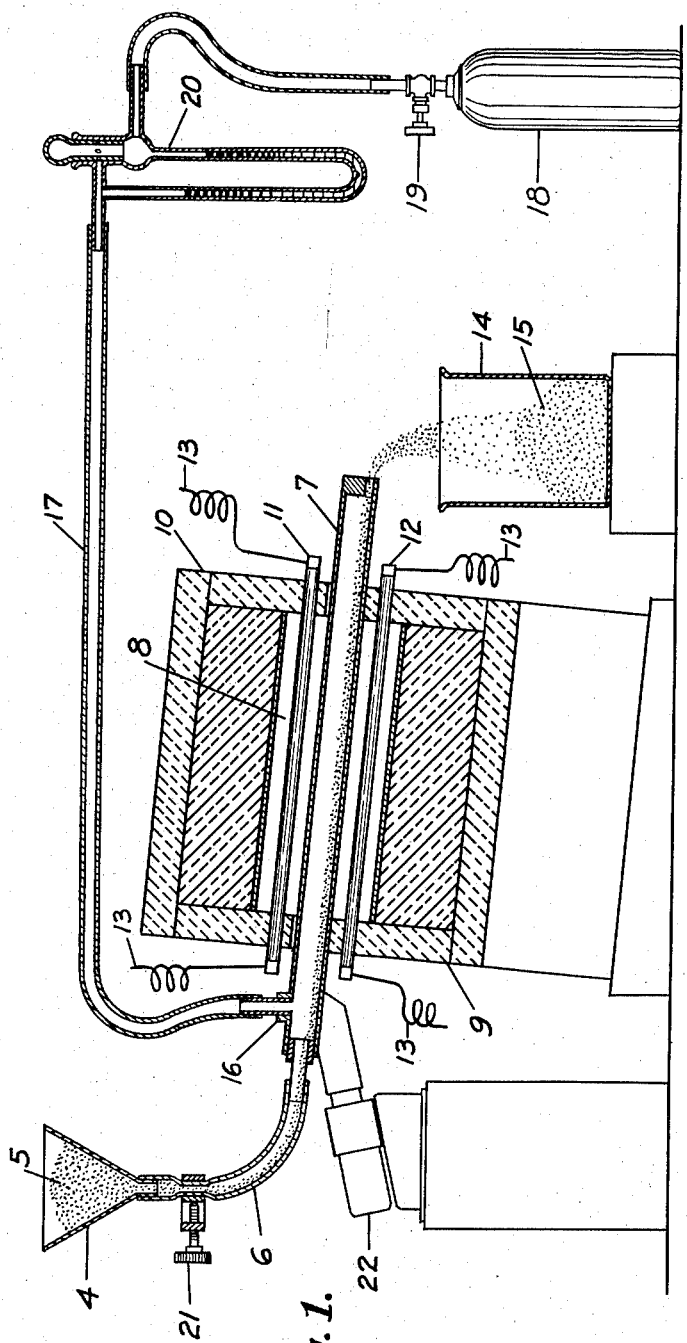

Oct. 21, 1952  C. B. PROUDFOOT  2,614,946
GRANULAR SILICON CARBIDE AND METHOD OF MAKING SAME
Filed March 17, 1950

INVENTOR.
CHARLES B. PROUDFOOT.
BY
ATTORNEY

Patented Oct. 21, 1952

2,614,946

UNITED STATES PATENT OFFICE 2,614,946

GRANULAR SILICON CARBIDE AND METHOD OF MAKING SAME

Charles B. Proudfoot, Niagara Falls, N. Y., assignor to The Carborundum Company, Niagara Falls, N. Y., a corporation of Delaware Application March 17, 1950, Serial No. 150,156

7 Claims. (Cl. 117—100)

This invention relates to a new granular silicon carbide material and to methods and means for making the same. More particularly it relates to a chemically treated silicon carbide material of novel characteristics and properties and to the chemical process by which such material is obtained.

Granular silicon carbide is a widely known material which has been commercially used over the last half century in large quantities for various abrasive and refractory purposes. The silicon carbide is removed in large chunks from the electric furnace in which it is formed and is crushed to the desired grit size or sizes and mixed with suitable bonding materials and used in the fabrication of such articles as grinding wheels and shapes, bricks and various other shapes for use as furnace linings and the like or adhesively secured to flexible sheet materials employed as backings to form coated abrasive products. The conventional silicon carbide grain of the prior art has been found highly satisfactory for most such abrasive and refractory usage.

In addition to the large volume of granular silicon carbide employed in the making of abrasive and refractory products certain properties of silicon carbide such as its extreme chemical inertness, its refractoriness or resistance to change at high temperatures, its thermal and electrical conductivity properties and the like have brought about its use in a number of specialty applications which take advantage of the above properties inherent in the material itself. Silicon carbide, from the standpoint of its electrical and thermal conducting properties, occupies the position of being a semi-conductor. In other words, it is not as thermally and electrically conductive as most metals and yet on the other hand it is not sufficiently non-conductive either thermally or electrically to be classed as an insulating material. However, full advantage of the thermal and electrical conducting properties has not been obtained in some applications because of the high contact resistance between the grains. This contact resistance is due in part to the tendency of the grains to oxidize, particularly at high temperatures thereby forming a film or coating of silica at the surface of the material, and interfering with the thermal and electrical conducting properties of the material as it exists originally. This high contact resistance is also due in part to the extreme hardness of the material which limits the contact to a very small area and thereby causes the contact resistance to be very high. Although its chemical inertness, refractoriness and resistance to breakdown under attrition suggests its ideal character for certain purposes, its high electrical contact resistance has also prevented its use in many applications where it would otherwise be an ideal material.

It is an object of the present invention to provide a novel form of granular silicon carbide which possesses many of the desirable properties of conventional silicon carbide but which differs therefrom fundamentally in electrical characteristics and surface behavior.

In accordance with the present invention I have found that if granular silicon carbide is treated with chlorine gas at an elevated temperature at which the chlorine reacts with the silicon carbide in accordance with the equation

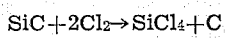

$$SiC + 2Cl_2 \rightarrow SiCl_4 + C$$

a new type of granular silicon carbide is obtained consisting of a nucleus or core of unreacted silicon carbide surrounded by or encased in a layer of carbon. The thickness of the carbon layer is dependent upon the temperature and duration of the reaction and upon the supply of chlorine and ranges from a thin enveloping integument of carbon of microscopic thickness, for example, in the neighborhood of one micron or less in thickness, up to a layer of carbon of substantial depth. This carbon surface is believed to be chemically bound to the unconverted silicon carbide nucleus or core of the granule from which it is derived since it is held to the core with great tenacity and resists removal under ordinary handling conditions and even when subjected to relatively severe attrition. The thusly formed carbon surface layer, especially when it is one of extreme thinness, is hard, black, and shiny in appearance, although it is considered to be microscopically porous since the reaction of the chlorine upon the silicon carbide granules when the reaction is carried out over prolonged periods of time seems to continue without interference from the thin enveloping carbon integument which is formed in the early stages of the reaction. The reaction between the chlorine and silicon carbide granules is strongly exothermic and must therefore be carried out under controlled temperature conditions. I have found that the reaction can be most conveniently and effectively performed at temperatures as low as 700° C. and up to 1000° C. when the reaction is carried out under substantially atmospheric pressure.

Silicon carbide grain when treated chemically in accordance with the present invention provides a carbon-surfaced silicon carbide granular material, the electrical resistance of which is only a fraction of that of untreated silicon carbide thereby providing an entirely new material suitable for many applications for which untreated silicon carbide is wholly unsuitable. For example, a lot of 70 grit size silicon carbide grain treated with chlorine at 1000° C. for a period of 1 minute was provided with a thin enveloping integument of carbon less than one micron thick, was of shiny black appearance and produced no appreciable dusting on ordinary handling. When subjected to electrical resistance measurements, the manner of which will be described in greater detail later, the carbon-surfaced grain showed an electrical resistance of 1.2 to 1.6 ohms, depending upon the pressure applied to the grain during the test, whereas untreated silicon carbide grain of similar size subjected to the same test under like pressures exhibited resistances of 250,000 to 700,000 ohms.

Figure 2:
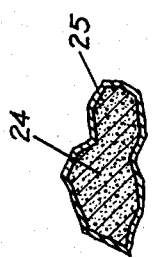

In order that the present invention and the manner in which it can be practiced may be better understood reference is made to the drawing, in which Figure 1 is a schematic elevational view, partially in section, of an apparatus suitable for carrying out the chemical treatment of granular silicon carbide in accordance with the present invention; and Figure 2 is a cross-section in highly magnified form of a silicon carbide granule after treatment in accordance with the process of the present invention.

Referring further to Figure 1 of the drawing, apparatus suitable for making the carbon-surfaced silicon carbide granular material of the present invention will now be described. A supply hopper 4 suitable for holding an ample supply of loose, granular silicon carbide 5 of the desired grit size to be treated is connected to a conduit 6, the lower or exit end of which leads into the upper end of an inclined refractory reaction tube 7, which refractory reaction tube 7 may be made of any refractory material which is substantially inert and will stand up under the temperatures and conditions at which the reaction is performed. A suitable tube for such use is one made of bonded alumina of high purity. The reaction tube 7 is mounted in a furnace chamber 8 which in the particular apparatus shown consists of end walls 9 and 10 suitably apertured and positioned to receive and hold the reaction tube 7 in an inclined position. The reaction chamber 8 is shown as electrically heated by means of upper and lower silicon carbide heating elements 11 and 12 which are connected to a suitable source (not shown) of electrical current by means of leads 13. The lower end of the reaction tube 7 extends over the open top of container 14 for receiving the treated silicon carbide 15 at the completion of the reaction. The tube 7 is provided with a side nipple 16 which is connected through suitable pipe line 17 to a cylinder 18 containing chlorine under pressure. The flow of chlorine gas is controlled by valve 19 and a manometer type flow meter 20 is inserted in the pipe line for measuring the rate of flow of the gas into the reaction chamber. The bottom end of the reaction tube 7 is open to permit the escape of gaseous products of reaction and any unreacted chlorine which are either collected or carried away by a suitable exhaust hood which is omitted from the apparatus shown for the sake of clarity. The rate of feed of the silicon carbide granules into the reaction chamber is governed by means of a valve 21 in the feed line 6 leading from the supply hopper 4.

After the supply hopper has been filled with a supply of granular silicon carbide to be treated and the furnace chamber and reaction tube brought up to the desired temperature and the flow of chlorine through the apparatus initiated by adjustment of the valve 19, the operation is started by opening the valve 21 and allowing a steady flow of the silicon carbide to enter the reaction tube 7. In order to promote the free movement of the silicon carbide grain through the reaction tube and to better control the rate of movement of the grain through the reaction zone the tube is subjected to a slight vibratory motion by any conventional vibrating mechanism 22 so that the silicon carbide grains gradually move downwardly into and through the tube at a uniform speed to the lower end where the treated grain falls into the receiver 14. The thickness of the carbon integument or layer developed in the surface portion of the granular silicon carbide depends upon the temperature at which the reaction is carried out, the period of time in which the silicon carbide is exposed to the reaction conditions and upon the supply of chlorine entering the reaction chamber. For example, in treating 70–80 mesh grit size granular silicon carbide in accordance with the description given above and in apparatus of the type shown in the drawing in which the temperature of the reaction tube was held around 950° C. and the silicon carbide granules were subjected to treatment for an average period of time of 15 to 30 seconds, the resulting silicon carbide was found to have a hard and shiny, strongly adherent carbon integument around one micron in thickness. The thickness of this film or integument of carbon was increased by either increasing the temperature of the reaction tube and/or slowing down the rate of travel of the silicon carbide grains through the tube.

Figure 2 schematically shows a granule of the treated silicon carbide as made in accordance with the present invention. The granule consists of a core or nucleus 24 of unreacted silicon carbide encased in an integument of carbon 25. The carbon surface layer 25 is derived from the surface portion of the original silicon carbide granule by reason of the reaction of the chlorine upon the outermost layer of the silicon carbide whereby the chlorine combines with the silicon removing it from the granule and leaving a residual layer of carbon. The porosity of the initially formed carbon layer is indicated by the fact that the reaction of the chlorine upon the silicon carbide granules, if allowed to proceed over prolonged periods of time takes place with no appreciable diminution of the rate of reaction due to the carbon layer during the latter stages of the process. However, in spite of this indicated porosity the carbon surface which is thus formed upon the silicon carbide and which is derived from the carbon of the original silicon carbide granule is so tenaciously held to the unconverted core of silicon carbide that it resists removal by frictional action such as that involved in normal handling of the material or when it is subjected to mild attrition. For example, silicon carbide granules which have been provided with a carbon surface in accordance with the above teachings have been subjected to an attrition test in which a quantity of the granules were placed in a cylinder which was then tumbled end over end for a period of 20 hours. Subsequent examination of the treated silicon carbide grains showed that the carbon surface suffered no appreciable damage or breakdown as a result of such attritive action.

One of the most pronounced differences between ordinary untreated silicon carbide grain and silicon carbide grain treated in accordance with the present invention is the difference in bulk electrical resistance of the material. For purposes of comparison the two grains were subjected to the following method of measuring the comparative relative resistance in bulk form, as well as to determine the effect of the duration of treatment upon the resistance of the resulting silicon carbide grain. The resistance measured is not that of the individual treated particle but is the resistance of a body of the loose, granular material under a measured amount of pressure.

A two gram sample of the silicon carbide grain to be tested was placed in a ceramic tube of one inch inside diameter, the ceramic tube when loaded with grain being equipped with a fixed electrode at one end and a free electrode at the opposing end. The ceramic tube containing the silicon carbide grain was then placed in a press and the sample of grain subjected to the desired amount of pressure at which the resistance was to be measured. In the tests conducted and reported in the table below pressures of 540 pounds per square inch and 1080 pounds per square inch were used. The silicon carbide of sample No. 1 of the table was an untreated conventional silicon carbide grain and samples Nos. 2, 3 and 4 were silicon carbide grains treated with chlorine at 1000° C. for different periods of time. All samples of silicon carbide were 70 grit size particles. The electrical resistances on samples 1 and 2 were measured with a Triplett No. 630 meter, made by the Triplett Electrical Instrument Company of Bluffton, Ohio. It is a triple purpose volt-ohm-ammeter used for measuring any one of volts, ohms or amperes. The electrical resistances of samples Nos. 3 and 4 were so low that a more sensitive meter was required, so that a Superior Instrument model P-25 milliohmer made by the Superior Instrument Company of New York city was used for the purpose.

*Table 1*

| Sample No. | Duration of Treatment with chlorine at 1,000° C. in minutes | Resistance in Ohms | |
|---|---|---|---|
| | | At 540 p. s. i. | At 1,080 p. s. i. |
| 1 | None | 700,000 | 250,000 |
| 2 | 1 | 1.60 | 1.20 |
| 3 | 4 | 0.240 | 0.184 |
| 4 | 8 | 0.160 | 0.125 |

The novel combination of physical properties of the present silicon carbide material makes it particularly suitable for many uses and applications for which conventional untreated silicon carbide of the prior art has been found not to be satisfactory. For example, the treated silicon carbide granular material of the present invention offers itself as an ideal material for use in various types of pressure-responsive, variable resistance transducers, such as microphones, vibration pickup devices, phonograph pickup devices, accelerometers, and so forth. The aforesaid mechanisms require a granular material which is hard and resistant to forces of attrition, chemically inert, and which in bulk form will possess a low order of electrical resistance which is responsive to mechanical pressure variations. The granular carbon which is used at the present time for such purposes is not entirely satisfactory because of its tendency to break down under forces of attrition to the point where its bulk electrical resistance is no longer of the order of magnitude required for proper functioning. On the other hand, conventional silicon carbide granules have heretofore been found unsatisfactory for the purpose because of the high order of magnitude and the non-linearity of the electrical resistance of the material in bulk form which high resistance requires line voltages greatly in excess of those normally permissible or desirable. Attempts heretofore to lower the order of magnitude of the electrical resistance of silicon carbide grain by externally applied coatings of materials have never met with any appreciable success.

The present material also offers itself for use in such electrical equipment as fixed resistors, variable resistors, compression type voltage regulators, high frequency resistors and the like.

The porosity of the carbon surface provided on the silicon carbide granular material, as well as its resistance to removal and inertness to chemical reaction renders it suitable for use as a catalyst or catalyst carrier.

The electrically conductive character of the carbon surface formed on the silicon carbide granular material makes the silicon carbide especially suitable for the manufacture of bonded abrasive articles such as resin bonded grinding wheels and the like where it is desirable to mature the resin bonded article by means of electrical conduction heating with either direct or low frequency current. The treated silicon carbide of the present invention, being more susceptible to heating by induction heating than conventional silicon carbide, is also highly useful in making bonded silicon carbide products by induction heating techniques, since the use of silicon carbide grain of such properties promotes an improved temperature uniformity throughout the article during the curing operation and therefore a finished article of more uniform properties.

Other uses and applications for the material of the present invention should be apparent from a consideration of its distinctive physical properties.

Having described the invention I claim:

1. A method of making granular silicon carbide material having in loose bulk form an electrical resistance comparable to granular carbon of similar size which comprises heating granular silicon carbide to a temperature at which it will react with gaseous chlorine, passing a stream of chlorine over the hot silicon carbide to effect reaction therewith, and stopping the reaction after it has progressed only a slight distance inwardly of the granules of silicon carbide.

2. A method of making granular silicon carbide material having in loose bulk form an electrical resistance comparable to granular carbon of similar size which comprises heating granular silicon carbide to a temperature at which it will react with gaseous chlorine, passing a stream of chlorine over the hot silicon carbide to effect reaction with the surface only of the silicon carbide grains.

3. A method of making carbon surfaced silicon carbide grain which comprises heating granular silicon carbide to a temperature at which it will react with gaseous chlorine, passing chlorine over the hot silicon carbide grains to react with an extract silicon from the outermost layer of the silicon carbide grains and stopping the reaction after an integument of residual carbon has been formed on the granules of silicon carbide.

4. A method of making carbon surfaced silicon carbide grain which comprises heating granular silicon carbide to a temperature at which it will react with gaseous chlorine, passing chlorine over the hot silicon carbide grains to react with and extract silicon from the outermost layer of the silicon carbide grains and stopping the reaction after a layer of residual carbon has been formed on the granules of silicon carbide.

5. A method of making carbon surfaced silicon carbide grain which comprises heating granular silicon carbide to a temperature of 700° C. to 1000° C., passing chlorine over the hot silicon carbide grains to react with and extract silicon from the outermost layer of the silicon carbide grains and stopping the reaction after an integument of residual carbon has been formed on the granules of silicon carbide.

6. A granular silicon carbide material, the individual particles of which comprise a silicon carbide core surrounded by a thin, adherent, porous layer of carbon integral with the silicon carbide core, said material having been made in accordance with the process of claim 3.

7. Granular silicon carbide, the particles of which have a tenaciously adherent, electrically conductive integument of carbon derived from the silicon carbide per se, said silicon carbide particles having been made in accordance with the process of claim 2.

CHARLES B. PROUDFOOT.

REFERENCES CITED

The following references are of record in the file of this patent:

UNITED STATES PATENTS

| Number | Name | Date |
|---|---|---|
| 1,973,703 | Goucher et al. | Sept. 18, 1934 |
| 2,149,671 | Franck | Mar. 7, 1939 |

OTHER REFERENCES

Hahn et al., "The Separation of Carbon from Carbides," from Metullurgie, vol. 3, page 727, Nov. 8, 1906.